(12) United States Patent
Lauderlein et al.

(10) Patent No.: US 8,465,082 B2
(45) Date of Patent: Jun. 18, 2013

(54) SIDE WINDOW FOR A MOTOR VEHICLE

(75) Inventors: Christian Lauderlein, Arnsberg (DE); Matthias Koenig, Menden (DE); Frank Wiebicke, Herscheid (DE); Ralf Gerndorf, Finnentrop (DE)

(73) Assignee: Dura Automotive Body & Glass Systems GmbH (DE)

( * ) Notice: Subject to any disclaimer, the term of this patent is extended or adjusted under 35 U.S.C. 154(b) by 309 days.

(21) Appl. No.: 12/825,841

(22) Filed: Jun. 29, 2010

(65) Prior Publication Data

US 2010/0327622 A1 Dec. 30, 2010

(30) Foreign Application Priority Data

Jun. 29, 2009 (DE) .......................... 10 2009 031 006

(51) Int. Cl.
*B60R 13/02* (2006.01)

(52) U.S. Cl.
USPC .................................. 296/146.15; 296/1.08

(58) Field of Classification Search
USPC ............................................ 296/1.08, 146.15
See application file for complete search history.

(56) References Cited

U.S. PATENT DOCUMENTS 4,904,014 A * 2/1990 Azarovitz et al. ........ 296/146.15

FOREIGN PATENT DOCUMENTS

| DE | 38 40 287 A1 | 5/1990 |
| DE | 40 08 702 A1 | 9/1991 |
| DE | 299 05 606 U1 | 6/2000 |
| DE | 10 2007 012 486 A1 | 9/2008 |
| EP | 1 695 808 A1 | 8/2006 |

* cited by examiner

*Primary Examiner* — Joseph Pape
(74) *Attorney, Agent, or Firm* — Allenman Hall . . .; Dean B. Watson (57) ABSTRACT

A side window for a vehicle, in particular for a motor vehicle, comprises a pane which includes an overmold made of plastics, to which a trim is attachable or attached. To improve such side window, the overmold includes one or more fastening elements on one side.

9 Claims, 10 Drawing Sheets

SIDE WINDOW FOR A MOTOR VEHICLE

CROSS REFERENCE TO RELATED APPLICATION

This application claims priority to German Patent Application No. 10 2009 031 006.1, entitled "Side Window for a Motor Vehicle", filed Jun. 29, 2009, which is hereby incorporated by reference in its entirety for all purposes.

BACKGROUND AND SUMMARY

This present disclosure relates to a side window for a vehicle, in particular for a motor vehicle, a trim for such side window, a side window arrangement for a vehicle, in particular a motor vehicle, which comprises such side window and such trim, and a vehicle, in particular a motor vehicle, with such side window arrangement.

The side window comprises a pane which includes an overmold made of plastics, to which a trim is attachable or attached. The trim can releasably or non-releasably be attachable or attached to the overmold. The pane can be made of glass or plastics. The overmold preferably completely surrounds the outer circumference of the pane. Preferably, it comprises a seal.

From DE 40 08 702 A1 a pane for a vehicle is known, which is held in a frame generated by overmolding the pane. For mounting the frame in the window aperture of the vehicle body, mounting brackets are arranged on the back of the side of the frame facing the vehicle pillar.

DE 10 2007 012 486 A1 discloses a fixed glass element for a vehicle roof with a holding frame which is formed by a foam cladding made of polyurethane.

From DE 38 40 287 A1 a motor vehicle pane with an overmold is known, to which a trim strip is attached.

DE 299 05 606 U1 discloses a motor vehicle pane with a pane overmold to which a trim is attached by metallic spring clips.

It is the object of the present disclosure to propose an improved side window of this type.

In accordance with the present disclosure, this object is solved in that on one side the overmold includes one or more fastening elements. The associated trim includes corresponding, and optional complementary fastening elements for the fastening elements of the side window. In this way, it is possible to attach the trim to the overmold. In particular, the trim can releasably be attached to the overmold.

The trim may comprise a first component made of plastics and a second component made of plastics. Such trim is known from EP 1 695 808 A1. The prior art trim comprises a first component made of plastics, namely a covering member made of a thermoplastic material and a second component made of plastics, namely a carrier member made of a thermoplastic material. The first component is provided on a visible surface of the trim. It performs a decorative function. The second component performs mechanical functions, in particular a mounting function. The trim is manufactured by a multi-component injection molding method, in particular by a two-component injection molding method (2-component method) or by a three-component injection molding method (3-component method). However, it is also possible to manufacture the trim by a one-component injection molding method (1-component method).

The fastening element(s) can be provided on the front side, the back side and/or the end face of the overmold. The fastening elements are provided on the front side or on the back side of the overmold. The fastening elements can be strip-shaped. Advantageously, the strip-shaped fastening elements are in alignment with each other.

Advantageously, the overmold includes one or more further fastening elements for the trim on a further side. The further fastening elements can be provided on the front side, the back side and/or the end face of the overmold. Advantageously, they are provided on the front side or the back side of the overmold. The fastening elements may be strip-shaped. Advantageously, the strip-shaped fastening elements are in alignment with each other.

A further advantageous development is characterized in that on one side, for example on the end face, the overmold includes one or more spacers. When several spacers are provided, the height thereof can be adjusted to the course of the trim.

Advantageously, the overmold includes a latching element on one side. The latching element may be disposed on the end face of the overmold. It is possible that a plurality of latching elements are provided.

The latching element may be designed as tab.

An inventive trim for a side window in accordance with the present disclosure is characterized by fastening elements for the fastening elements of the side window. The fastening elements of the trim correspond to the fastening elements of the side window and are complementary to the fastening elements of the side window. In particular, the fastening elements are designed as fastening pockets.

Advantageously, the trim includes further fastening elements for the further fastening elements of the side window. The further fastening elements of the trim correspond to the further fastening elements of the side window, and may be complementary to the same. The further fastening elements in particular can be further fastening pockets.

In accordance with another advantageous development, abutments for the spacers of the side window are provided on the trim.

Advantageously, the trim includes one or more latching steps for the latching elements of the side window. When a plurality of latching steps are provided, there is a possibility for adjustment of the trim on the side window. This possibility for adjustment can be utilized in particular for tolerance compensation.

The present disclosure furthermore relates to a side window arrangement for a vehicle, in particular for a motor vehicle, which is characterized by a side window and one or more trims in accordance with the present disclosure.

Advantageously, the fastening element(s) and/or the further fastening elements(s) and/or the spacer(s) and/or the latching element(s) is/are provided on a side of the overmold of the side window which substantially extends in vertical direction.

The present disclosure finally relates to a vehicle, in particular a motor vehicle, which is characterized by one or more window pane arrangements in accordance with the present disclosure.

An embodiment of the present disclosure will be explained in detail below with reference to the attached drawings.

DETAILED DESCRIPTION

Figure 1:
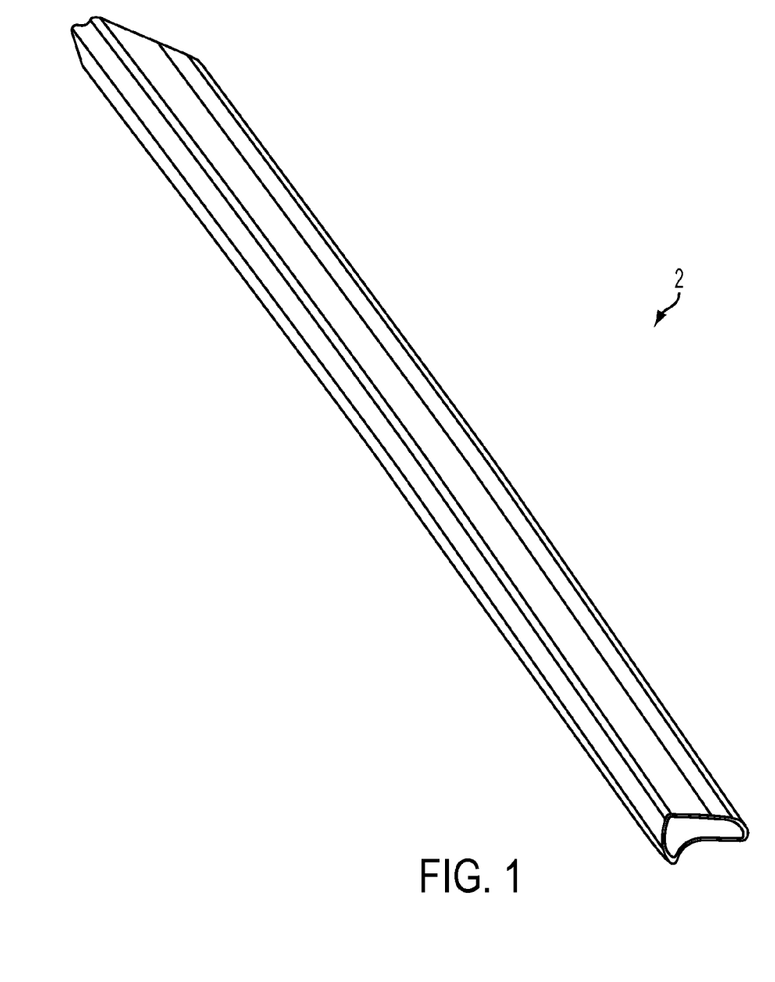
FIG. 1 shows a trim in a side view from the front.
Figure 2:
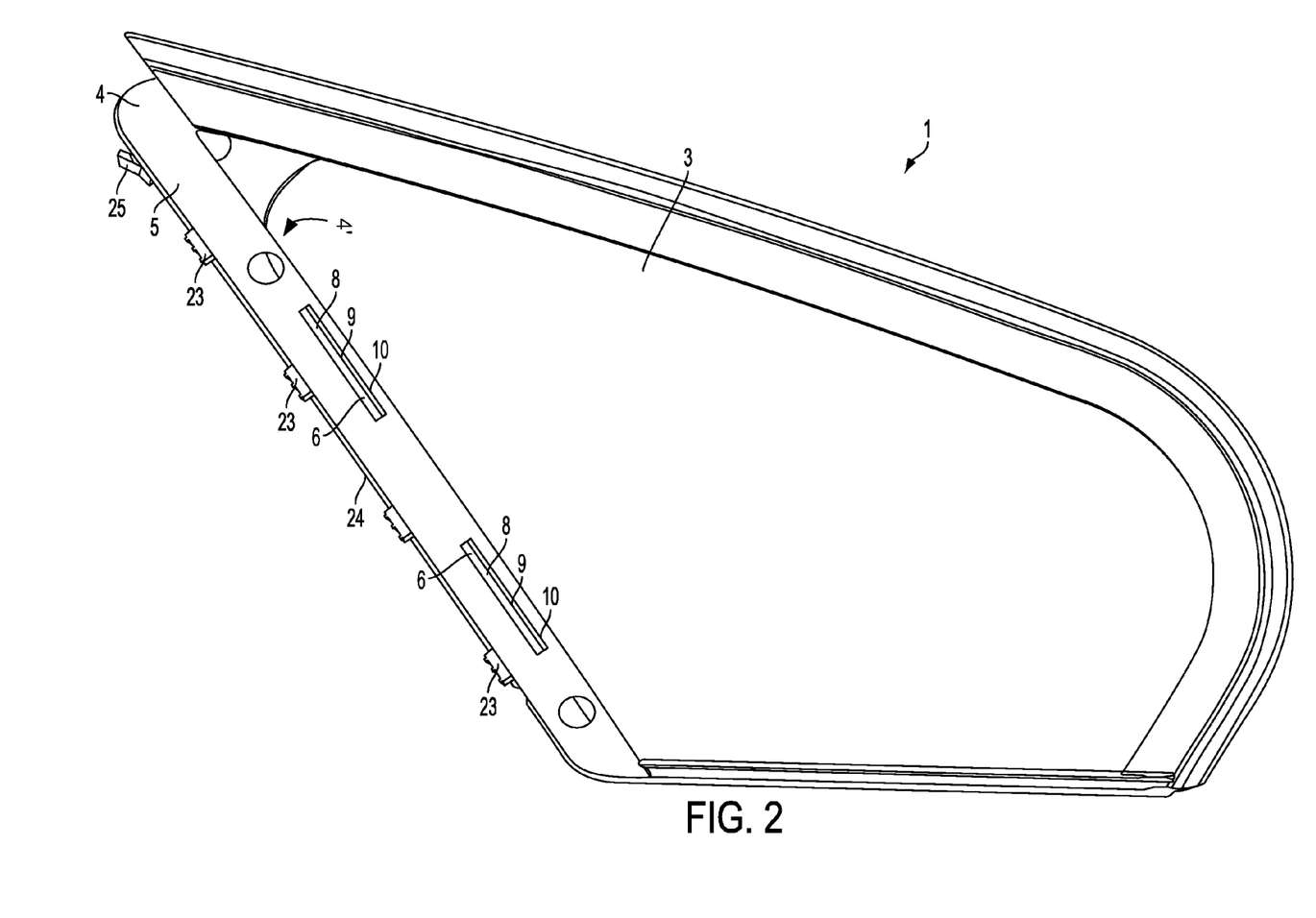
FIG. 2 shows a side window in a side view from the front.
Figure 3:
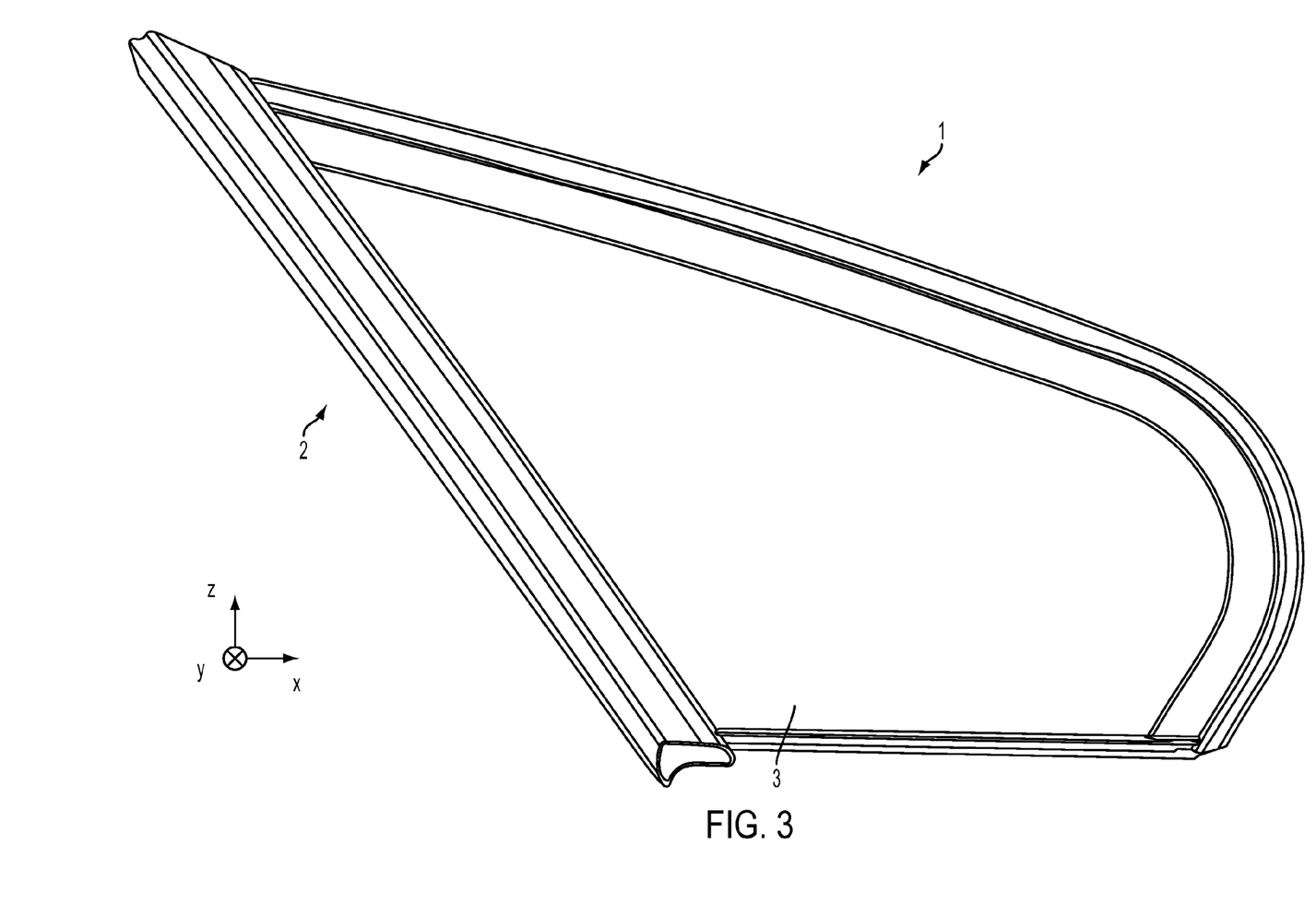
FIG. 3 shows a side window arrangement with a trim according to FIG. 1 and with a side window according to FIG. 2 from the front.

The side window arrangement shown in FIG. 3 comprises a side window 1 according to FIG. 2 and a trim 2 according to FIG. 1, which is connected with the side window 1. As shown in FIGS. 2 and 3, the side window 1 comprises a pane 3 made of glass or plastics and an overmold 4 made of plastics, to which the trim 2 can be attached. The trim 2 can be mounted and locked into place in X-direction on the overmold 4 of the side window 1. The X-direction extends in longitudinal direction of the vehicle, the Y-direction extends horizontally and transverse to the longitudinal direction of the vehicle, and the Z-direction extends vertically upwards.

As shown in particular in FIG. 2, the overmold 4 comprises a seal 4' and includes fastening elements 6 for the trim 2 on its front side 5. The fastening elements 6 are strip-shaped. These are two strip-shaped fastening elements which extend in longitudinal direction of the overmold 4, i.e. parallel to the associated edge 7 (FIG. 7) of the pane 3. The strip-shaped fastening elements 6 are spaced from and in alignment with each other.

Figure 7:
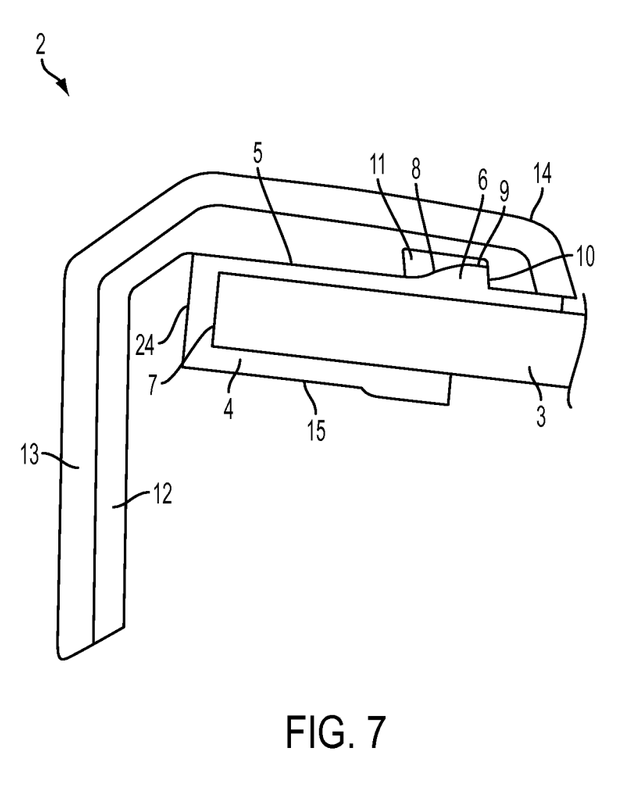
FIG. 7 shows a section through the side window arrangement according to FIGS. 3 and 6, wherein the sectional plane is located in the region of a fastening element on the front side of the side window and outside the spacers.
Figure 8:
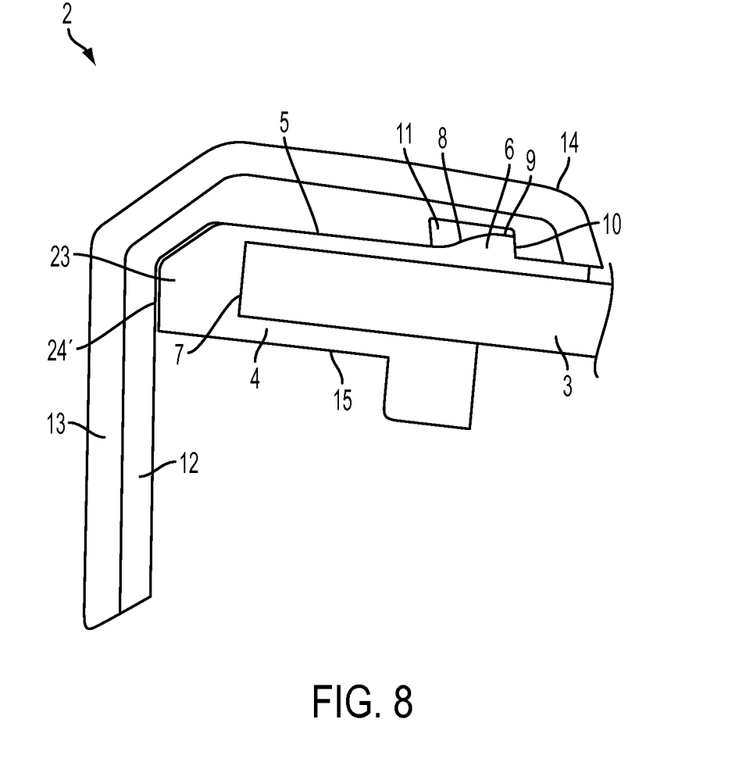
FIG. 8 shows another section through the side window arrangement according to FIGS. 3 and 6, wherein the sectional plane is located in the region of a fastening element on the front side of the side window and in the region of a spacer.

As shown in FIGS. 7 and 8, the fastening elements 6 each have an insertion bevel 8 which extends inclined with respect to the plane of the pane 3, namely such that its distance from the pane 3 increases with increasing distance from the edge 7. In direction away from the edge 7 a flat region 9 adjoins the insertion bevel 8, which extends parallel to the pane 3, and a steeply sloping region 10, which extends almost vertical to the plane of the pane 3. The steeply sloping region 10 might also extend vertical to the pane 3. However, its steepness may be chosen such that the overmold 4 still can be removed from the injection molding tool.

Figure 4:
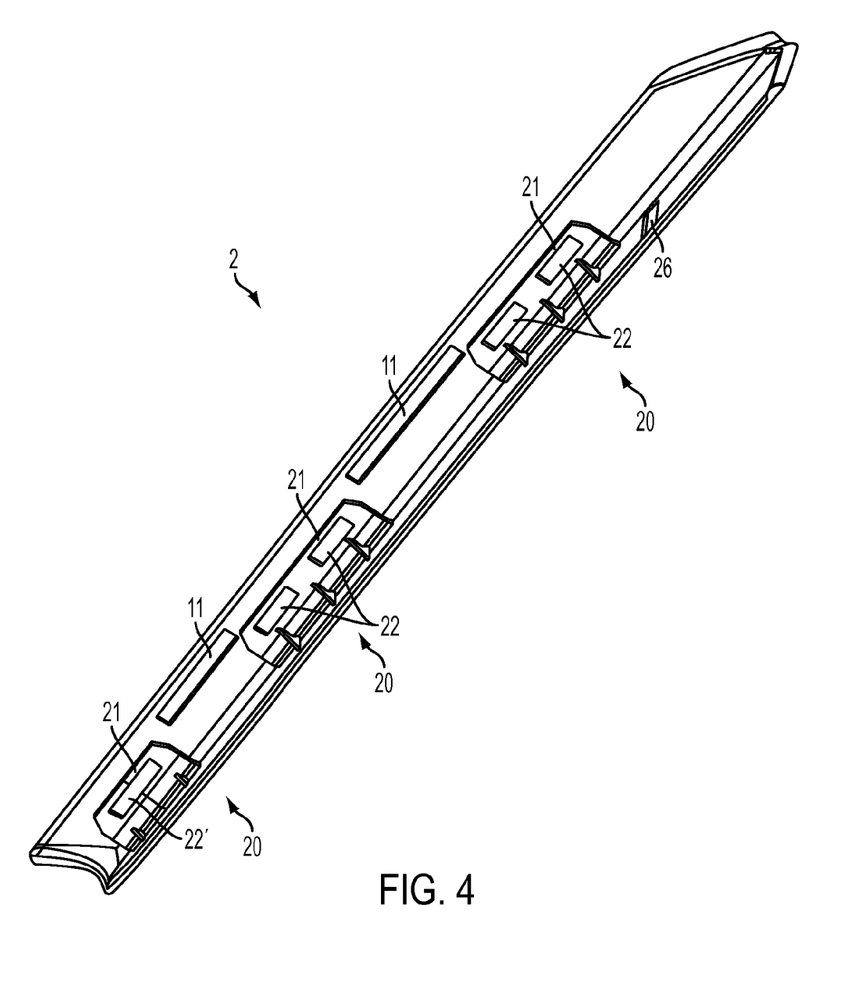
FIG. 4 shows the trim according to FIG. 1 in a side view from behind.

As shown in particular in FIGS. 4, 7 and 8, the trim 2 includes fastening elements 11 which are complementary to the fastening elements 6 of the overmold 4 of the side window 1. The fastening elements 11 constitute fastening pockets. They are located in the first plastic component 12 of the 2-component plastic trim 2, which is disposed on the inside and faces the overmold 4 and the pane 3. The second plastic component 13 of the 2-component plastic trim forms the outer surface, including the visible surface 14.

As shown in FIGS. 7 and 8, one side of the trim 2 substantially L-shaped in cross-section can be bent up by the insertion bevel 8 during assembly. In the mounted position as shown in FIGS. 7 and 8, one side face of the fastening pocket 11 locks into place at the steeply sloping region 10 of the strip-shaped fastening element 6.

As shown in particular in FIGS. 4, 5, 6 and 9, the overmold 4 includes further fastening elements 16 for the trim 2 on a further side, namely on its back side 15. The further fastening elements 16 are strip-shaped. They consist of two groups of two strip-shaped fastening elements 16 each and of a further strip-shaped fastening element 16'. Within one group, the strip-shaped further fastening elements 16 are arranged at a distance from and in alignment with each other. Furthermore, the further fastening elements 16 of both groups are in alignment with each other and with the further fastening element 16'.

Figure 9:
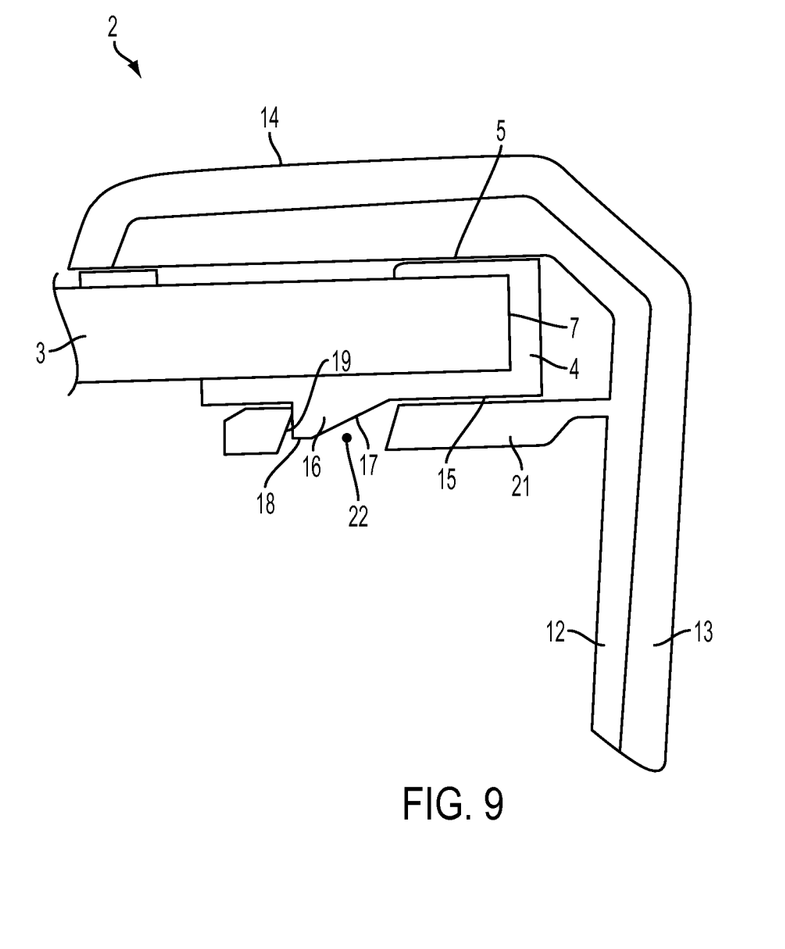
FIG. 9 shows a section through the side window arrangement according to FIGS. 3 and 6, wherein the sectional plane is located in the region of a further fastening element on the back side of the side window and outside the spacers.
Figure 10:
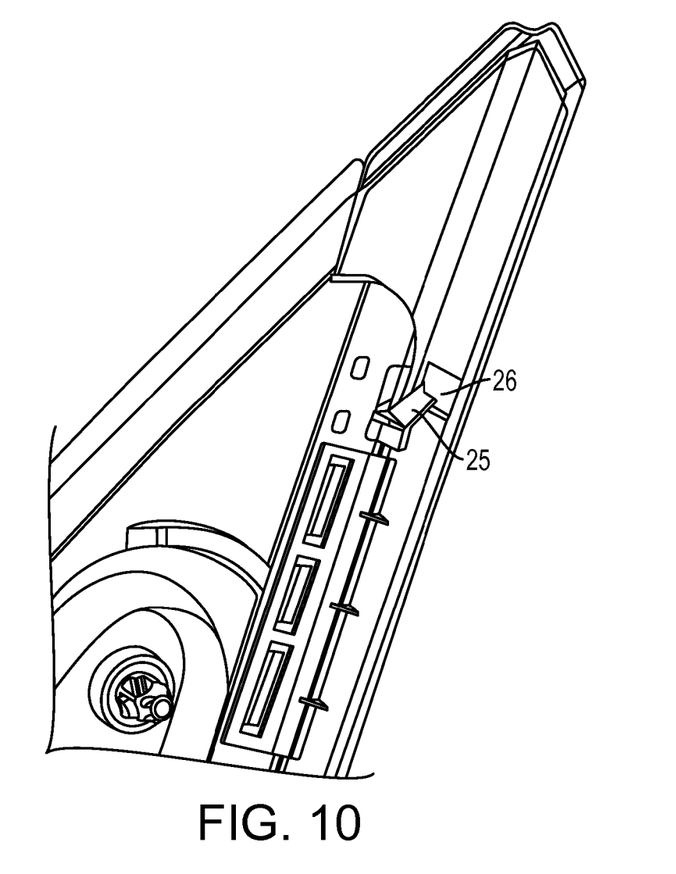
FIG. 10 shows an enlarged partial view from FIG. 6.

As shown in particular in FIG. 9, the further fastening elements 16, 16' each comprise an insertion bevel 17, a flat region 18 and a steeply sloping region 19. In the region of the insertion bevel 17, the thickness of the overmold 4 increases with increasing distance from the edge 7 of the pane 3.

The trim 2 includes further fastening elements 20 for the further fastening elements 16, 16' of the overmold 4 of the side window 1, which are complementary to the further fastening elements 16, 16'. The further fastening elements 20 of the trim 2 consist of fastening tabs 21, which are provided on one side of the substantially L-shaped trim 2. The fastening tabs 21 extend parallel to and at a distance from the fastening elements 11 of the trim 2, which constitute fastening pockets. There are provided three fastening tabs 21, which are arranged at a distance from and in alignment with each other. In two fastening tabs 21 two substantially rectangular openings 22 each are provided, which are each complementary to two further strip-shaped fastening elements 16 of the overmold 4. In a further fastening tab 21 a substantially rectangular opening 22' is provided, which is complementary to the further strip-shaped fastening element 16' of the overmold 4.

Figure 6:
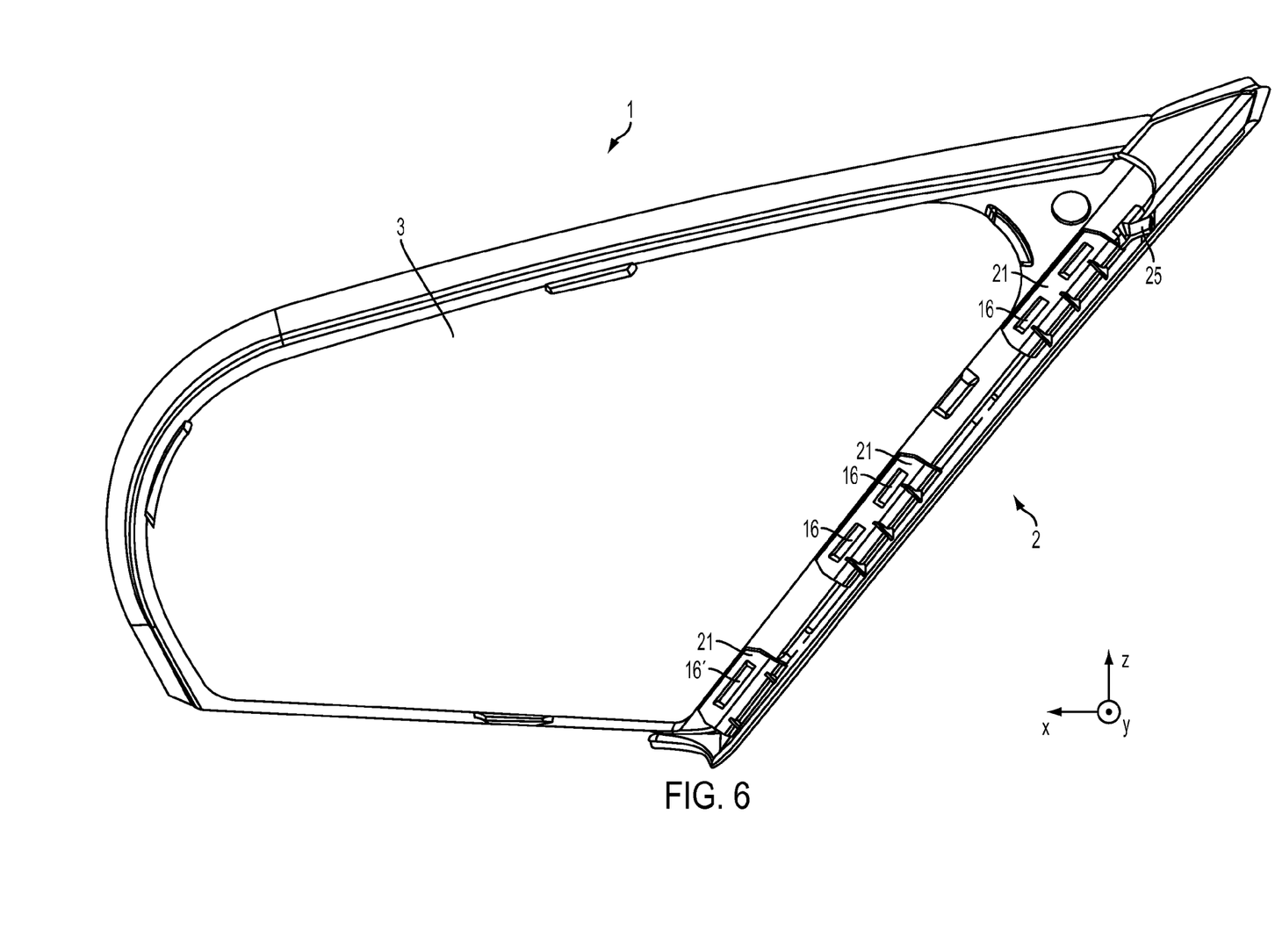
FIG. 6 shows the side window arrangement according to FIG. 3 in a side view from behind.

In the mounted condition, which is shown in FIGS. 6 and 9, each further fastening element 16, 16' is located in the associated opening 22, 22'. During assembly, the ends of the fastening tabs 21 can be bent up by the insertion bevels 17. In the mounted condition, which is shown in FIGS. 6 and 9, the steeply sloping region 19 of the respective further fastening element 16, 16' locks into place at the respective outer edge of the respective opening 22, 22'.

Figure 5:
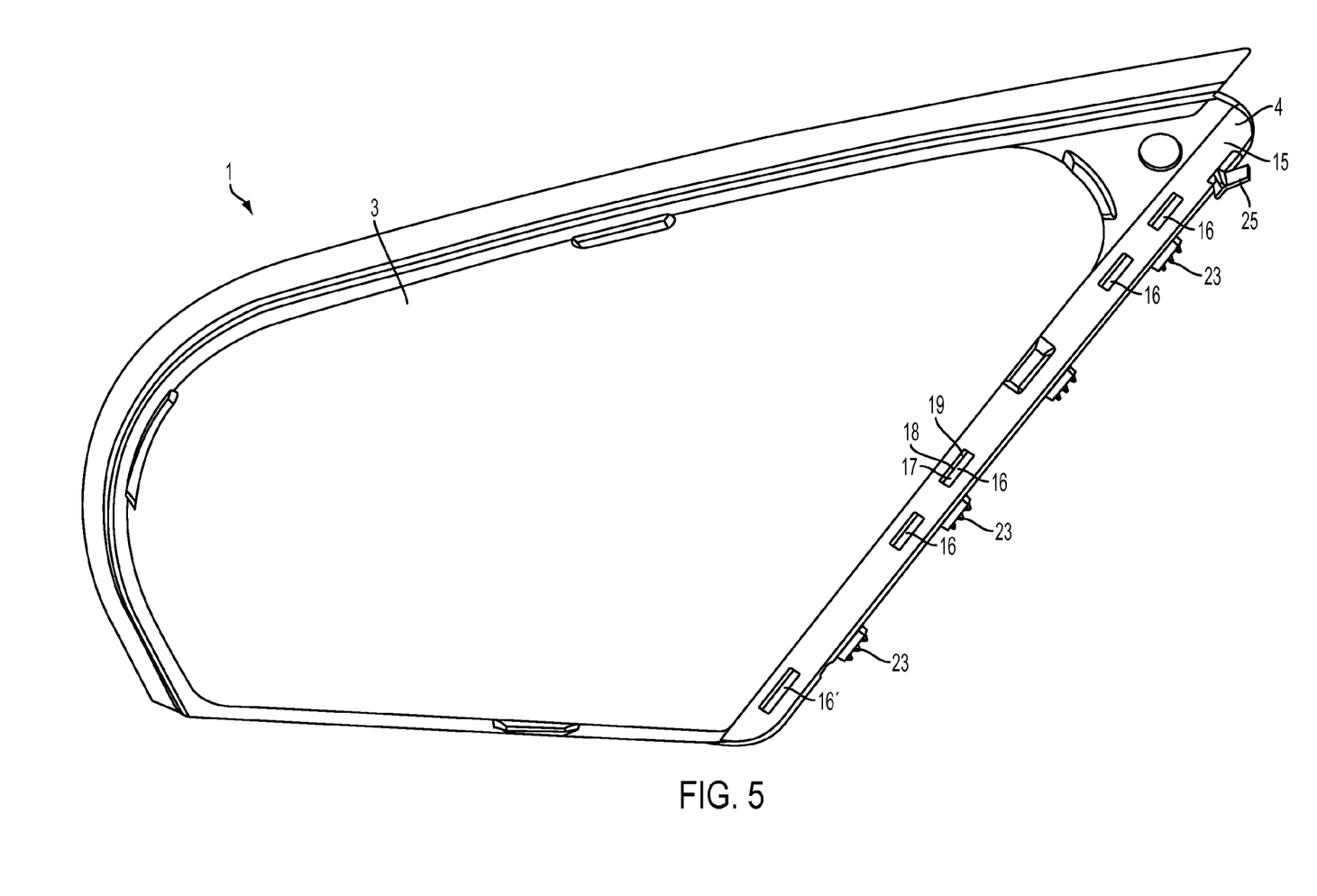
FIG. 5 shows the side window according to FIG. 2 in a side view from behind.

As shown in particular in FIGS. 2, 5 and 8, the overmold 4 includes spacers 23 for the trim 2 on its end face 24. The spacers 23 are substantially cuboid. On their upper surface, they each have three webs spaced from and extending parallel to each other, which can be compressed. On the trim 2, abutments 24' are provided for the spacers 23.

On one side, namely on its end face 24, the overmold 4 includes a latching element 25, which is shown in particular in FIGS. 2, 5, 6 and 10. The latching element 25 is designed as tab. It points obliquely outwards.

Figure 11:
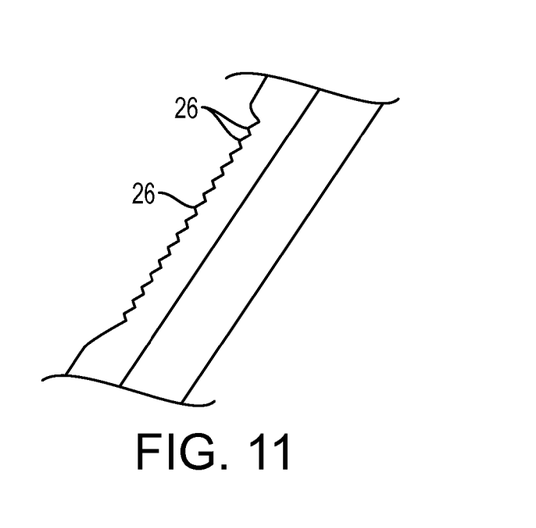
FIG. 11 shows an enlarged segment from FIG. 10.

On the trim 2, latching steps 26 are provided for the latching element 25. In the mounted condition, the outer terminal edge of the latching element 25 locks into place at one of the latching steps 26. The latching steps 26 are shown on an enlarged scale in FIG. 11. They have a barbed profile, wherein the flanks of the latching steps 26 facing the latching element 25 extend short and steep and the other flanks are formed long and flat.

The fastening elements 6, the further fastening elements 16, 16', the spacers 23 and the latching element 25 are provided on a side of the overmold 4 which extends substantially in vertical direction, i.e. in Z-direction. In other words: The overmold 4, on which the fastening elements 6, the further fastening elements 16, 16', the spacers 23 and the latching element 25 are provided, extends substantially in vertical direction, i.e. in Z-direction. By means of the latching element 25 a possibility for adjustment in this Z-direction is created, which provides for a tolerance compensation in Z-direction. During assembly, the trim can be shifted upwards in Z-direction, until it has reached the correct position. By locking the latching element 25 into place at a latching step 26, this position is fixed; a downward displacement of the trim 2 is prevented by locking into place.

By means of the present disclosure a side window for a vehicle, in particular for a motor vehicle, is created, in which a trim made of plastics can directly be locked into place on a pane overmolded with a seal. A possibility for adjustment of the trim is integrated. Both in the trim and in the overmold a latching function is integrated. For locking into place or joining, no additional components (fastening elements) are required. The trim is movable or adjustable on the pane in Z-direction. In this way, tolerances can be compensated in Z-direction.

The invention claimed is:

1. A system for a vehicle, the system comprising:
    a side window for the vehicle, including a pane which includes an overmold made of plastics; and
    a trim for the side window, the trim being attachable or attached to the overmold, wherein on a first side of the overmold, the overmold includes one or more overmold fastening elements for the trim and on a second side of the overmold, the overmold includes one or more further fasting elements for the trim, the trim including trim fastening elements corresponding to the overmold fastening elements of the side window.

2. The system according to claim 1, wherein the trim further includes additional trim fastening elements corresponding to the further overmold fastening elements of the side window.

3. The system according to claim 1, wherein the overmold includes one or more spacers on an end face extending between the fist side and the second side, the trim further comprising abutments corresponding to the spacers of the side window.

4. The system according to claim 3, wherein on the end face, the overmold includes a latching element, the trim further comprising one or more latching steps corresponding to the latching element of the side window.

5. The system according to claim 1, wherein the vehicle is a motor vehicle.

6. The system according to claim 4, wherein the one or more overmold fastening elements and the one or more further overmold fastening elements and the spacers and the latching element are provided on the fist side of the overmold and the second side of the overmold, both sides substantially extending in a vertical direction relative to the vehicle.

7. The system of claim 1, wherein the trim is movable or adjustable on the pane in a vertical direction relative to the vehicle.

8. The system of claim 1, wherein the one or more further fastening elements are strip-shaped and each comprise an insertion bevel, a flat region, and a steeply sloping region, a thickness of the overmold increasing with increasing distance from an edge of the pane in the region of the insertion bevel.

9. A side window for a vehicle, comprising:
    a pane;
    a plastic overmold comprising a seal, a front side of the overmold including one or more fasting elements and a back side of the overmold opposite the front side including one or more further fasting elements; and
    a trim attachable or attached to the overmold, the trim being directly locked into place on the pane, the pane being overmolded with the seal, wherein the trim and the overmold each include an integral latch for locking into place via the one or more fastening elements and the one or more further fasting elements without any other additional components, the trim being movable or adjustable on the pane in a vertical direction with respect to the vehicle.

* * * * *